United States Patent

Nisnevich et al.

Patent Number: 5,772,751
Date of Patent: Jun. 30, 1998

[54] CEMENT-BOUND LIGHT-WEIGHT INSULATING STRUCTURAL MONOLITHIC AGGREGATE CONCRETE

[75] Inventors: Mark L. Nisnevich, Saba; Boris I. Kompaneetz, Efraim, both of Israel

[73] Assignee: College of Judea and Samaria, Ariel, Israel

[21] Appl. No.: 851,065

[22] Filed: May 5, 1997

Related U.S. Application Data

[63] Continuation-in-part of Ser. No. 548,792, Oct. 26, 1995, abandoned.

[51] Int. Cl.⁶ .......................... C04B 20/00; C04B 28/04; C04B 28/08
[52] U.S. Cl. .......................................... 106/679; 106/672
[58] Field of Search ................................... 106/679, 707, 106/672

[56] References Cited

U.S. PATENT DOCUMENTS

| | | | |
|---|---|---|---|
| 3,961,973 | 6/1976 | Jones | 106/679 |
| 4,038,095 | 7/1977 | Nicholson | 106/724 |
| 4,052,220 | 10/1977 | Turpin, Jr. | 106/725 |
| 4,089,696 | 5/1978 | Ray | 106/696 |
| 4,102,962 | 7/1978 | Matsui et al. | 264/82 |
| 4,268,317 | 5/1981 | Rayl | 106/681 |
| 4,373,956 | 2/1983 | Rosskopf | 106/725 |
| 4,401,472 | 8/1983 | Gerber | 106/707 |
| 4,407,769 | 10/1983 | Harada et al. | 264/60 |
| 4,547,223 | 10/1985 | Goto et al. | 106/802 |
| 4,789,532 | 12/1988 | Jons et al. | 423/240 |
| 4,895,598 | 1/1990 | Hedberg et al. | 106/694 |
| 5,002,610 | 3/1991 | Sherif et al. | 106/691 |
| 5,037,197 | 8/1991 | Majumdar et al. | 106/692 |
| 5,084,102 | 1/1992 | Brouns et al. | 106/707 |
| 5,183,505 | 2/1993 | Spinney | 106/672 |
| 5,482,549 | 1/1996 | Blaakmeer et al. | 106/606 |
| 5,494,514 | 2/1996 | Goodson et al. | 106/677 |

FOREIGN PATENT DOCUMENTS

| | | | |
|---|---|---|---|
| 681011 | 8/1979 | U.S.S.R. | 106/707 |
| 846513 | 7/1981 | U.S.S.R. | 106/707 |
| 1133242 | 1/1985 | U.S.S.R. | 106/707 |

Primary Examiner—David Brunsman
Attorney, Agent, or Firm—Mark M. Friedman

[57] ABSTRACT

A light-weight concrete comprising cement, highly porous coarse and/or fine aggregates, such as furnace bottom-ash from thermal power stations or other porous natural or artificial materials, with a porosity of about 20–50% and an additive, preferably fly-ash from thermal power stations and other natural or artificial finely ground materials passing a 100 μm screen, and water. According to the invention the additive is used for (i) closing (bridging) air-voids in the cement paste and pores in the light-weight aggregates which increases the concrete density and strength, although using the highly porous aggregates and low to medium cement content; (ii) increasing the durability of the concrete by closing the air-voids and pores in the hardened mortar; (iii) reducing the segregation of concrete mix constituents arising due to the difference in density of the porous aggregate and the surrounding cement paste and (iv) lowering the consumption of cement.

25 Claims, 1 Drawing Sheet

Fig. 1

CEMENT-BOUND LIGHT-WEIGHT INSULATING STRUCTURAL MONOLITHIC AGGREGATE CONCRETE

This is a continuation-in-part of U.S. patent application Ser. No. 08/548,792, filed Oct. 26, 1995 now abandoned.

FIELD AND BACKGROUND OF THE INVENTION

The present invention relates to concretes in general and, more particularly, to a light-weight insulating structural monolithic aggregate concrete.

Light-weight concretes are defined as concretes with a density lower than 1,800 kg/m³, whereas normal-weight (i.e., regular, ordinary, heavy) concretes are defined as concretes with a density higher than 1,800 kg/m³ according to ISO/TC71/SC3/WG1 N89.

Light-weight concretes may be subdivided according to their structure to (i) monolithic concretes, which are light-weight concretes having a monolithic structure; (ii) cellular concretes, which are light-weight concretes including large air-voids; and (iii) aggregate concretes, which are light-weight concretes including aggregates.

Light-weight concretes may be additionally subdivided according to their use to (i) insulating concretes used for insulating articles (e.g., insulating masonry units, insulating elements for ceilings and the like) production; (ii) structural concretes used for structures (e.g., beams, columns and the like) construction to support lesser weights, as compared with normal-weight concretes; and (iii) insulating-structural concretes used for both objectives.

Aggregates may be subdivided according to their grading (i.e., particle size) to (i) coarse aggregates, defined as particles having a diameter higher than 4.75 mm (according to ASTM C330-89 and C331-89) or 5.00 mm (according to BS 3797:1990); (ii) fine aggregates with particle size smaller than 4.75 mm (according to ASTM C330-89 and C331-89) or 5.00 mm (according to BS 3797:1990); and (iii) compound (also known as combined) aggregates which include a combination of coarse and fine aggregates (according to ASTM C330-89 and C331-89).

Aggregates may be further subdivided according to their density into (i) light-weight (porous) aggregates having bulk density equal to, or lower than, the densities listed in Table I, depending whether coarse, fine or compound; and, (ii) normal-weight (e.g., dense, solid) aggregates defined as having bulk density higher than the densities listed in Table I, depending whether coarse, fine or compound.

TABLE I

| Aggregate | Max Bulk density | Max Density of particles |
| --- | --- | --- |
| light-weight coarse aggregates | 1,000 kg/m³ (BS 3797:1990) 880 kg/m³ (ASTM C330/1–89) | 1.8 g/cm³ (ISO/TC71/SC3/WG1 N89) |
| light-weight fine aggregates | 1,200 kg/m³ (BS 3797:1990) 1,120 kg/m³ (ASTM C330/1–89) | 1.8 g/cm³ (ISO/TC71/SC3/WG1 N89) |
| light-weight compound aggregates | 1,040 kg/m³ (ASTM C330/1–89) | 1.8 g/cm³ (ISO/TC71/SC3/WG1 N89) |

Three main directions are currently pursued for light-weight concrete production. These include (i) replacing normal-weight coarse and fine aggregates or coarse aggregates solely by light-weight (e.g., porous) aggregates; (ii) increasing the porosity of the hardened cement paste by increasing the volume of air-voids in the hardened paste; and (iii) a combination of the above mentioned directions.

As is further detailed hereinbelow, the light-weight concrete according to the present invention is an improved light-weight concrete which has been developed in accordance with the first direction for light-weight concrete production mentioned above.

Three main sources of materials are currently used as light-weight coarse, fine or compound aggregates:

(a) Natural or processed volcanic igneous rocks containing air-voids and having an open texture.

(b) Aggregates produced by the pyroprocessing of certain natural materials such as, but not limited to, clay, shale, slate, perlite, vermiculite and the like.

(c) Expanded industrial by-products and waste materials such as but not limited to:
 (i) Processed pulverized-fuel ash, often referred to as 'fly-ash', pelletized and stabilized by pyroprocessing or other means.
 (ii) Furnace bottom-ash which is a fused residue obtained from furnaces fired with pulverized coal.
 (iii) Foamed blast-furnace slag which is made of aggregates manufactured by foaming molten blast-furnace slag with sufficient water or other suitable medium to produce a cellular product.
 (iv) Pelletized expanded blast-furnace slag which is an expanded blast-furnace slag produced in a pelletized form.
 (v) a fused residue from furnaces fired with coal which has not been pulverized (known in the art as clinker).

Three main types of light-weight aggregates are specified in the specification of ASTM C330-89 and ASTM C 331-89 as follows:

(a) Aggregates prepared by processing natural materials such as pumice, scoria and tuff (which are volcanic igneous rocks containing air voids and having an open texture).

(b) Aggregates prepared by expanding pelletizing or sintering products such as blast-furnace slag, clay, diatomite, fly-ash, shale, slate and the like.

(c) Aggregates which are the end products of coal or coke combustion (such as furnace bottom ash and fused residues from furnaces fired with coal which has not been pulverized).

However, according to the known art, using light-weight aggregates of high porosity in concrete production introduces three major drawbacks.

A first drawback is a reduced strength of the produced concrete due to the replacement of the normal-weight (solid) aggregates (e.g., crushed stone, gravel, natural sand and crushed sand) with light-weight (porous) aggregates. It should be noted that, the light-weight coarse aggregates form a volume approximately equal to 50% of regular concrete volume, whereas the light-weight fine aggregates, of approximately 20%.

A second drawback is a phenomenon of undesired segregation of the components of the concrete mix during the process of mixing, handling and placing (collectively referred hereinafter as forming) the concrete, which phenomenon is due to the difference in densities between the particles of light-weight (porous) coarse and fine aggregates and the surrounding cement paste (i.e., the mixture of cement and water).

A third drawback involves formation of air-voids in the hardened cement paste when low to middle-range quantities of cement occurring in insulating and some structural light-weight concretes. These air-voids allow penetration of water and aggressive environmental conditions, not only to the hardened cement paste, but also to the light-weight (porous) coarse and fine aggregates, which increases the area of environmental attack on the concrete, resulting in rapid degradation. Therefore, overcoming this drawback essentially requires increasing the durability of light-weight aggregate concrete.

There is thus a widely recognized need for, and it would be highly advantageous to have, a light-weight concrete devoid of the above mentioned drawbacks. This goal and more are achieved according to the present invention by (i) providing an improved cement-bound light-weight insulating structural monolithic aggregate light-weight concrete, possessing the optimal correlation of desirable building properties which are low density and low thermal conductivity, with sufficiently high strength and durability; (ii) reducing the segregation of the concrete mix components during its making, handling and placement (which segregation is the result of the difference in densities between the particles of light-weight (porous) aggregate and the surrounding cement paste), thereby improving the quality and workability of the concrete mix; (iii) providing a novel building material meeting the requirements of the first and the second advantages described hereinabove, which novel building material will essentially lower the amounts of required raw materials, including cement, as compared with existing technologies and will increase the use of waste and industrial by-products.

SUMMARY OF THE INVENTION

According to the present invention there is provided an improved cement-bound insulating structural monolithic aggregate concrete possessing an optimal correlation of desirable building properties of a concrete structure.

According to further features in preferred embodiments of the invention described below the light-weight concrete comprising (a) a hardened paste, the hardened paste including a hardened mixture of cement, typically having a high density in the range of about 2.9–3.3 g/cm$^3$ and an additive, the additive being close in grading (i.e., particle size) to cement and having a medium density in the range of about 1.5–2.5 g/cm$^3$; and (b) light-weight porous aggregates having a low density in the range of about 1.0–1.8 g/cm$^3$; the additive being for replacing air-voids in the hardened paste and for, at least partially, filling-in open pores in the light-weight porous aggregates, such that the light-weight concrete becomes denser and therefore stronger and more durable, the additive being further for reducing the segregation of the light-weight porous aggregates while forming the concrete, while at the same time for reducing the cement content in the light-weight concrete.

According to still further features in the described preferred embodiments the light-weight concrete is prepared by preparing a concrete mix including about 8–20% cement by weight, about 13–33% additive by weight, and about 29–67% light-weight aggregates by weight and water (not including the water required for moistening the aggregates).

According to still further features in the described preferred embodiments provided is a light-weight concrete mix comprising about 8–20% cement by weight, preferably the cement having a high density e.g., in the range of about 2.9–3.3 g/cm$^3$, about 13–33% of an additive, by weight, the additive having a medium density, preferably in the range of about 1.5–2.5 g/cm$^3$, and about 29–67% of a light-weight porous aggregate, by weight, the aggregate having a low density in the range of about 1.0–1.8 g/cm$^3$ and water, the additive being for reducing segregation of the light-weight porous aggregates while preparing the concrete mix, while at the same time for reducing the cement content in the light-weight concrete mix.

According to still further features in the described preferred embodiments provided is a method of manufacturing an improved cement-bound insulating structural monolithic aggregate light-weight concrete possessing optimal correlation of desirable building properties of a concrete structure, the method comprising the steps of (a) preparing a concrete mix including about 8–20% cement, by weight, the cement having a high density, typically in the range of about 2.9–3.3 g/cm$^3$, about 13–33% of an additive, by weight, the additive having a medium density in the range of about 1.5–2.5 g/cm$^3$, and about 29–67% of a light-weight porous aggregate, by weight, the aggregate having a low density in the range of about 1.0–1.8 g/cm$^3$ and water; (c) forming a light-weight concrete article by molding the concrete mix in a mold; and (e) drying the concrete article.

According to still further features in the described preferred embodiments the additive is selected from the group consisting of fly-ash and grounded limestone, dolomite, and sandstone having a grain size smaller than about 100 micrometers.

According to still further features in the described preferred embodiments the cement is selected from the group of cements consisting of Portland cement and Portland blast-furnace cement.

According to still further features in the described preferred embodiments the aggregates are selected from the group of aggregates consisting of a fine light-weight aggregates having a bulk density lower than 1,200 kg/m$^3$ and passing a sieve of 4.75 mm, a coarse light-weight aggregate having a bulk density lower than 1,000 kg/m$^3$ and retained in a sieve of 4.75 mm and a compound light-weight aggregate having a bulk density lower than 1,040 kg/m$^3$.

According to still further features in the described preferred embodiments the light-weight aggregate is selected from the group consisting of furnace bottom-ash from thermal power stations, natural volcanic igneous rocks containing air-voids and having an open texture, and aggregates produced by pyroprocessing of a natural material, an industrial by-product or a waste material.

According to still further features in the described preferred embodiments the natural material is selected from the group consisting of clay, shale, slate, perlite and vermiculite.

According to still further features in the described preferred embodiments the industrial by-product and waste material are selected from the group consisting of a pelletized and stabilized pulverized-fuel ash, a foamed blast-furnace slag, a pelletized expanded blast-furnace slag and a fused residue from furnaces fired with coal which has not been pulverized.

According to still further features in the described preferred embodiments the weight ratio of the additive and the combination of the additive and the cement is about 0.6–0.73, preferably 0.6–0.65.

The goal of the present invention is to provide a light-weight concrete comprising cement, highly porous coarse and/or fine aggregates, such as furnace bottom-ash from thermal power stations or other porous natural or waste materials, with a porosity of about 20–50% and an additive, preferably fly-ash from thermal power stations or other natural or artificial finely grounded materials passing a 100

μm screen, and water. According to the present invention the additive is used for (i) closing (bridging) air-voids in the hardened cement paste and open pores present in the light-weight aggregates, which increases the concrete s density and strength, although using the highly porous aggregates and low to medium cement content; (ii) increasing the durability of the concrete by closing the air-voids and pores therein; (iii) reducing the segregation of the concrete mix constituents arising through the difference in density of the porous aggregates and the surrounding cement paste; (iv) lowering the consumption of cement; and (v) providing means of exploiting industrial waste materials and environmental pollutants.

BRIEF DESCRIPTION OF THE DRAWINGS

The invention is herein described, by way of example only, with reference to the accompanying drawing, wherein.

DESCRIPTION OF THE PREFERRED EMBODIMENTS

The present invention is of an improved cement-bound light-weight insulating structural monolithic aggregate concrete possessing an optimal correlation of desirable building properties. Specifically, the desired building properties of the light-weight concrete of the present invention are low density and low thermal conductivity in accordance with insulating concrete requirements; and sufficiently high strength and durability, in accordance with structural concrete requirements.

The desired building properties of the light-weight concrete of the present invention are achieved by using coarse, fine or compound (coarse and fine) light-weight (porous) aggregates such as, but not limited to, types of furnace bottom-ash, combined with an additive. The additive is a fine material which is equivalent or close in grading (i.e., particle size) to cement and has a medium density value (between that of the porous aggregates and that of the cement particles). Mixing the cement and the additive with water results in the formation of a cement-additive paste which enables to control the concrete density by replacing air-voids typically formed in the cement paste of light-weight concretes characterized by low to medium cement content, and, at least partially, filling-in open pores of the light-weight (porous) aggregates, to form a light-weight concrete of the desired properties, in which concrete the amounts of cement and aggregates used are remarkably reduced and is, therefore, cost effective.

By means of the present invention, it is possible to minimize the inevitable reduced strength and durability of light-weight aggregate concretes, which usually compares non-favorably with ordinary, normal-weight, aggregate concretes.

According to the present invention as porous coarse, fine or compound (coarse and fine) aggregates, preferably employed is furnace bottom-ash from thermal power stations.

It will be appreciated by one ordinarily skilled in the art that the furnace bottom-ash used as porous coarse, fine or compound aggregate in the light-weight concrete of the present invention may be replaced for other light-weight aggregates such as, but not limited to, (a) natural volcanic igneous rocks containing air-voids and having an open texture; (b) aggregates produced by the pyroprocessing of certain natural materials such as, but not limited to, clay, shale, slate, perlite, vermiculite and other natural materials; (c) industrial by-products and waste materials such as but not limited to, pelletized expanded blast-furnace slag, foamed blast-furnace slag, a fused residue from furnaces fired with coal which has not been pulverized and pelletized and stabilized pulverized-fuel ash.

Further according to the present invention, as an additive aimed at replacing the air-voids in the hardened cement paste within the concrete, which air-voids typically appear in light-weight concrete compositions characterized by low to medium cement content, and at filling-in open pores of the light weight aggregates, preferably employed is an unprocessed pulverized fuel ash from thermal power stations, referred to hereafter as fly-ash.

The density (including the pores) of the furnace bottom-ash from thermal power stations, based on data from numerous tests, is from 1.0 to 1.8 g/cm$^3$, whereas the density of the fly-ash is from 2.0 to 2.2 g/cm$^3$.

The furnace bottom-ash wastes from thermal power stations are permissible as aggregates for light-weight concrete by the ASTM C331-89; and the BS 3797:1990, SI5, part 1, 1989, standards. However, these standards are limited to general recommendations as to the possible uses of different wastes and are elaborated in this respect on an essentially lower level than the requirements for other aggregates, such that it is practically substantially impossible to use highly porous furnace bottom-ash to provide a light-weight concrete with the required strength and durability for most applications.

For example, using furnace bottom-ash from thermal power stations with a density of 1.0 to 1.2 g/cm$^3$, obtained was, depending on the cement content, a light-weight concrete characterized by low strengths as measured by compressing a standard sample, having dimensions of 100×100× 100 mm$^3$, on a press, as summarized in Table II, wherein MPa is megapascal.

TABLE II

| Content of cement kg/m$^3$ | Strength of light-weight concrete MPa |
| --- | --- |
| 150 | 1.8 |
| 200 | 4 |
| 250 | 6 |
| 300 | 8.5 |

In view of the low strength of light-weight concretes based upon the use of highly porous furnace bottom-ash from thermal power stations as aggregates (as for example depicted in Table II above), their use is limited even in articles such as masonry units. The excessive porosity of the furnace bottom-ash aggregates has a negative influence on the strength and durability of these concretes, which negative influence adds to the negative influence imposed by the porosity of the hardened cement paste itself in concrete structures characterized by low to medium cement content (see Table III, hereinbelow).

As mentioned above, a well-designed light-weight aggregate concrete has coarse aggregates consisting approximately 50% and fine aggregates consisting approximately 20% of the concrete volume (the correlation between coarse and fine aggregates correspond the ASTM C331-89 standard).

The porosity of the cement paste itself (i.e., not including the porosity of light-weight fine aggregates) in concrete structures was determined and is presented in Table III below.

TABLE III

| Content of cement kg/m³ | Porosity of hardened cement paste % |
|---|---|
| 100 | 19–20 |
| 150 | 15–16 |
| 200 | 12–13 |
| 250 | 8–10 |
| 300 | 6–8 |
| 350 | 4–7 |

In order to obtain a monolithic light-weight concrete with a cement content of 150 kg/m³, while replacing air-voids in the hardened cement paste to a level of 5–7%, it is necessary, according to the prior art technologies, to apply at least 50 liters of cement paste (ca. 100 kg of cement), whereas according to the present invention the porosity of the hardened cement paste is lowered by applying an additive such as fly-ash from thermal power stations, or an equivalent, as it serves for replacing air-voids in the hardened paste thus formed. It further, at least partially, fills-in open pores of porous light-weight aggregates, which is of high importance when highly porous aggregates are of choice. As a result, the obtained concrete is denser and stronger.

Fly-ash from thermal power stations is presently the preferred additive according to the present invention due to its high availability. Nevertheless, other fine materials which pass a 100 $\mu$m screen and which has an intermediate density value (e.g., in the range of about 1.5–2.5 g/cm³), between the density values of the light aggregate (e.g., 1.0–1.8 g/cm³) and cement (e.g., 2.9–3.2 g/cm³) are also within the scope of the present invention. Thus, when the term 'additive' is used herein, it refers any fine material which passes a screen of about 100 $\mu$m and has a medium density value. Examples include, but are not limited to, grounded materials such as limestone, dolomite, sandstone and the like, preferably from waste formed during crushed stone production.

By replacing part of the cement with fly-ash such that the general mass of fly-ash is greater by a factor of 0.5–4.0 relative to the remained cement, the following decrease in concrete porosity was observed:

TABLE IV

| Water/cement ratio | Fly-ash/cement ratio | Porosity of hardened cement-fly-ash paste |
|---|---|---|
| 0.5 | 0.5 | 2.4 |
| | 1.1 | 2.2 |
| | 2.0 | 2.1 |
| 0.6 | 0.6 | 2.8 |
| | 1.1 | 2.3 |
| | 2.5 | 2.2 |
| 0.7 | 0.7 | 6.1 |
| | 1.2 | 3.1 |
| | 2.8 | 2.7 |
| 0.8 | 0.8 | 9.5 |
| | 1.4 | 4.0 |
| | 3.2 | 3.2 |
| 0.9 | 0.9 | 6.5 |
| 1.0 | 1.5 | 5.0 |
| | 3.5 | 3.5 |
| | 1.0 | 7.7 |
| | 1.7 | 6.6 |
| | 4.0 | 3.7 |

For some applications light-weight concrete was manufactured using concrete mixes of the following compositions (i) Portland cement (activity 25 MPa)—120–300 kg/m³; (ii) furnace bottom-ash (density including pores 2.05 g/cm³)—450–858 kg/m³; (iii) fly-ash (density 2.0 g/cm³)—185–450 kg/m³ and water.

Light-weight concretes of the above compositions have a density of 1,318–1,535 kg/m³; strength of 6.8–13.3 MPa and thermal conductivity of 0.327–0.373 W/m° C. Thus very light concretes with desirable strength and insulating properties were obtained.

At present, fly-ash from thermal power stations is used in cement production as an additive to Portland cement, in limited quantities, for the purpose of economy in cement production. This additive causes a certain lowering of cement activity.

There are known examples of fly-ash used in greater quantities than the quantities used for the production of Portland cement, as an optional additive to some special kinds of cement and special kinds of normal-weight concretes.

These include, for example, (a) reinforced magnesium phosphate fast-setting cement, comprising effective amounts of fibers in combination with particles of different rocks and rock-forming minerals as well as industrial by-products and waste materials including fly-ash (U.S. Pat. No. 5,002,610); (b) high-alumina cement comprising pozzolanic or latently hydraulic materials (silica fume, gasifier furnace bottom-ash, fly-ash and others), which encourage the formation of gehlenit octahydrate (U.S. Pat. No. 5,073,197); (c) particulate cement having a specific surface area of 500–750 m²/kg (U.S. Pat. No. 5,084,102); and (d) binding agent mainly for soil reinforcement, road surfacing and other goals (SU 864,513).

U.S. Pat. No. 5,002,610, relates to an improved fast setting cement, used in repairing or patching cracks, holes and spalled areas of highways, airfield pavements and other applications which are altogether not associated with light-weight concrete use. The process of making a fast setting cement according to U.S. Pat. No. 5,002,610, includes: mixing a solid activator including a $P_2O_5$ material absorbed into a porous material (preferably diatomaceous earth), with a magnesium containing component and an effective amount of fibers to increase the impact strength of the cement. This property, however, is not necessary for light-weight concrete. According to the invention described in U.S. Pat. No. 5,002,610, the fibers are selected from the group consisting of glass, metal and organic material fibers and, combinations thereof. Furthermore, according to this invention, aggregates are used in combination with fibers, preferably, graded sand or different rocks or rocks forming minerals such as granite, basalt, dolomite, andesite, feldspar, amphibole, pyroxene, olivine, gabbro, rhiolite, sienite, diorite, dolerite, peridotite, trachite, obsidian, quarts, etc., as well as materials such as furnace bottom-ash, cinders, fly-ash, glass cullet, wood chips and, fibrous materials, such as, chopped metal wires and, glass, asbestos, cotton, polyester and aramide fibers. Nevertheless, according to this invention, as described hereinabove, aggregates having different particles, shapes and sizes may be used. Furthermore, requirements for mineral and chemical composition are not mentioned, in addition, fly-ash is not distinguished among all other materials. These aggregates influence cement composition (content of binding agent) and activity, but their use, fly-ash in particular, is one of many alternatives and is not essential for the disclosed invention.

U.S. Pat. No. 5,073,197, relates to a high alumina cement comprising CaO in amounts ranging from 35% to 45% and, $Al_2O_3$, in amounts ranging from 38% to 55%. According to this invention, the advantageous of high alumina cement such as early strength and resistance to sulfate attack, are preserved and, its disadvantage, weakening with age, is solved by mixing it with silica fume, gasifier furnace bottom-ash, fly-ash or other pozzolanic or latently hydraulic materials, which mixing encourages the formation of gelenite octahydrates in the cement. However, the hydraulic activity (pozzolanic effect) of fly-ash depends essentially on its specific surface, which surface varies widely for fly-ash obtained from different thermal power stations. Fly-ash with the specific surface of less than 1,500 $cm^2/g$ has a low hydraulic activity and does not correspond to the requirements of the invention described under U.S. Pat. No. 5,073,197.

In contrast, according to the present invention, the use of fly-ash for forming a dense hardened cement paste in light-weight concrete structures is not dependent upon the availability and value of the pozzolanic effect or the specific fineness of the fly-ash.

U.S. Pat. No. 3,961,973 teaches a method of selecting and processing furnace bottom-ash for the production of light-weight aggregates for concrete, comprising not more than 5% $SO_3$ and 1% $FeS_2$. This invention centers around certain aggregates collected and/or selected from dry bottom-ashes which fully meet the required specifications, including cases when bottom-ash and fly-ash enter into common ponds. In the later case, the inventor considers an excessive fly-ash content in the pond as deleterious to the aggregate since in such cases the mass of the product is increased and the product presents a proportion of fineness which is too high to meet the required specifications. According to U.S. Pat. No. 3,961,973 the content of fly-ash (particles passing a 100 $\mu$m screen) in the aggregate is limited to 25%. The percent of the fly-ash in the concrete is even lower—ca. 5%–15%, depending whether it was used for structural or insulating (masonry units) production purposes. The bulk density of bottom-ash obtained was 1,133 $kg/m^3$ which does not correspond to the requirements for coarse and combined light-weight aggregate set forth by the ASTM C330, C331 or BS 3797 standards (see Table I above). According to U.S. Pat. No. 3,961,973 fly-ash is considered an undesirable impurity in bottom-ash based aggregates.

SU 681,011 teaches furnace bottom-ash concrete mix for manufacturing coal mine lining shafts. The concrete mix according to SU 681,011 includes a binder (i.e., cement, 10%–26% by weight), slag-ash aggregates (60.5%–79.5% by weight) and water (to complete to 100% by weight). The furnace slag-ash aggregates include furnace bottom-ash particles (furnace bottom-ash) of a bulk density ranging between 1,100 and 1,500 $kg/m^3$ and fly-ash with particles size ranging from 1 $\mu$m to 0.315 mm. The ratio between the slag and fly-ash particles ranges between 4:1 to 3:2 (3.5:1.5, or 11:4, on the average). The source for slag-ash aggregates, according to SU 681,011, includes fly-ash precipitated from discharged gases and slag obtained from melted mineral parts of anthracite coal or bituminous coal burned in furnaces of thermal power stations.

Thus, according to the above description, the fraction of fly-ash employed is calculated to be ca. 20%–32% of the total mix by weight, nevertheless, the fraction of fly-ash in the range of about 100 $\mu$m (106 $\mu$m according to ASTM E11 screen) or less (assuming a linear distribution of particle size in the 1 $\mu$m–0.315 mm range) is about a third (i.e., a maximum of ca. 10%). It appears that fly-ash from the Starobeshevski thermal power station, which is the source for fly-ash used according to SU 681,011, is of a different quality as compared with fly-ashes produced by U.S. power stations. For example, 79%–84.5% by weight of fly-ashes produced by three different U.S. power stations passes a 45 $\mu$m screen.

Furthermore, as a coarse component of the slag-ash aggregates, slag having a bulk density of 1,100–1,500 $kg/m^3$ is used. A slag having such a bulk density is defined by both ASTM C330-89 and C331-89, and the more permissive BS 3797:1990, standards as a normal-weight aggregate (see Table I above).

Yet furthermore, the density of fly-ash particles (assumed to be about 2.0 $g/cm^3$) is lower than the density of the slag particles (given a bulk density of slag of 1,100–1,500 $kg/m^3$, the density of its particles including pores is about 2.2–2.6 $g/cm^3$). Therefore, using fly-ash, in this case, does not reduce the segregation of the concrete mix, which is one of the advantages of the light-weight concrete according to the present invention.

In addition, a concrete mix according to SU 681,011 is prepared using high-production mixers with forced action, employing the technology of component mixing for the manufacture of heavy concrete (the Russian term 'heavy concrete' corresponds to the US term 'normal-weight concrete') having a density of 2,050 to 2,300 $kg/m^3$. The content of cement (activity 50 MPa) in the examples given in SU 681,011 is 225 $kg/m^3$; 370 $kg/m^3$; and 598 $kg/m^3$, which is ordinary (and even excessive) for normal-weight concrete of the corresponding strengths 135 $kg/cm^2$; 322 $kg/cm^2$; and 518 $kg/cm^2$, all as reported in SU 681,011. All this is further emphasized from the intended use of the concrete mix according to SU 681,011—manufacturing coal mine lining shafts which are expected to resist extreme forces.

In sharp contrast, the present invention provides a light-weight concrete having a density of 1,100–1,800 $kg/m^3$. The concrete according to the present invention includes a hardened cement-additive paste and light weight aggregates. The additive may be selected from fly-ash or grounded limestone, dolomite or sandstone having grain size smaller than about 100 $\mu$m. As fine, coarse or compound light-weight aggregates serve furnace bottom-ash from thermal power stations, natural porous volcanic igneous rocks and aggregates produced by pyroprocessing of natural materials and industrial by-products or waste materials having a bulk density not exceeding 1,000 $kg/m^3$ for coarse aggregates; 1,200 $kg/m^3$ for fine aggregates and 1,040 $kg/m^3$ for compound aggregates.

Further according to the present invention, the ratio between the additive mass and the total cement-additive mass is preferably 0.6–0.65, wherein the additive replaces 30–45% of the cement by weight, depending on the cement/water ratio employed. The ratio of the additive mass and the total additive-aggregate mass, according to the invention, is typically in the range of 0.16–0.52, depending on the cement/water ratio used.

Table V below presents a comparison of concretes manufactured according to the present invention and concretes manufactured according to SU 681,011 under three different water/cement ratios:

TABLE V

| Water/cement ratio (W/C) | Source* | Concrete density Kg/m³ | Cement content (C) Kg/m³ | Cement content (C) % | Fly-ash (f.a.) % | Bottom ash (b.a.) % | Water % | f.a. / (f.a. + C) | f.a. / (f.a. + b.a.) |
|---|---|---|---|---|---|---|---|---|---|
| 0.5 | 1 | 1,506 | 270 | 17.9 | 30.8 | 33.2 | 19.0 | 0.63 | 0.48 |
| 0.5 | 2 | 2,300 | 598 | 26.0 | 18.1 | 42.3 | 13.5 | 0.4 | 0.3 |
| 0.7 | 1 | 1,392 | 175 | 12.5 | 21.6 | 51.7 | 14.2 | 0.63 | 0.29 |
| 0.7 | 2 | 2,180 | 371 | 17.0 | 21.1 | 49.3 | 12.5 | 0.55 | 0.3 |
| 1.0 | 1 | 1,307 | 115 | 8.8 | 13.0 | 67.0 | 11.2 | 0.60 | 0.16 |
| 1.0 | 2 | 2,050 | 205 | 10.1 | 23.8 | 55.8 | 10.5 | 0.29 | 0.3 |

*1 = present invention; 2 = SU 681,011

In particular please note that in all cases SU 681,011 teaches a normal-weight concrete (>1,800 kg/m³), whereas according to the present invention provided is a light-weight concrete (<1,800 kg/m³).

SU 1,133,242 teaches a concrete mix for manufacturing floors for stock-breeding areas characterised by high heat insulating properties. According to SU 1,133,242, for lowering the heat conductivity of the concrete, sand is used as a fine solid (dense) aggregate in combination with coarse aggregate and fly-ash in a proportion of 2.2 (sand) to 4.3 (coarse aggregate and fly-ash).

As coarse and fine aggregates granular materials of glassy structure are employed, for example furnace bottom-ash from thermal power stations and other waste materials. The density of the aggregate particles is of 2.05–2.50 g/cm³, i.e., these aggregates are classified as normal-weight aggregates (see Table I above). The heat conductivity coefficient of this concrete was determined to be 0.46–0.56 W/m° C., whereas its strength is 5–15.8 MPa which is fairly low for concrete including solid (dense) aggregates. Fly-ash is used in concrete based on dense aggregates for lowering its heat conductivity. Using fly-ash according to SU 1,133,242 has an opposite goal as compared with the present invention. According to the present invention fly-ash is used in light-weight concretes in combination with highly porous aggregates for increasing the density of the hardened mortar by replacing air-voids (in the hardened paste) and, at least partially, filling-in open pores (in the aggregates) with matter, whereas according to SU 1,133,242 fly-ash is used for lowering the density of the concrete and thereby its thermal conductivity.

Thus, in contrast with all cited prior art, fly-ash additive as used according to the present invention has the objective of replacing air-voids in the hardened cement paste and, at least partially, filling-in open pores in the light weight aggregates of the concrete, while employing ordinary Portland cement or Portland blast-furnace cement in low to medium quantities, and therefore to increase the strength and durability of the concrete.

The use of fly-ash as an additive in light-weight concrete production, with the objective of lowering the porosity and therefore increasing the density of the hardened cement mortar in concrete structures, is herein suggested for the first time.

The use of fly-ash as an additive in the light-weight concrete according to the present invention involves the following features:

(a) Replacing part of the cement (25–45% in mass) by fly-ash.

(b) Employing fly-ash as a concrete additive over and above this quantity, such that the ratio of the fly-ash mass and the total mass of cement and fly-ash is preferably in the range of 0.6–0.65 (beyond the fly-ash mass used as a component of cement in its production—e.g., Portland cement). Fly-ash which is used herein as a concrete additive, is for replacing air-voids typically characterizing a light-weight hardened cement paste and for, at least partially, filling-in open pores present in the porous aggregates employed.

(c) Using access amounts of water for moistening the fly-ash, over and above the volume of water typically necessary for providing the water/cement ratio and water absorption of aggregates.

Figure 1:
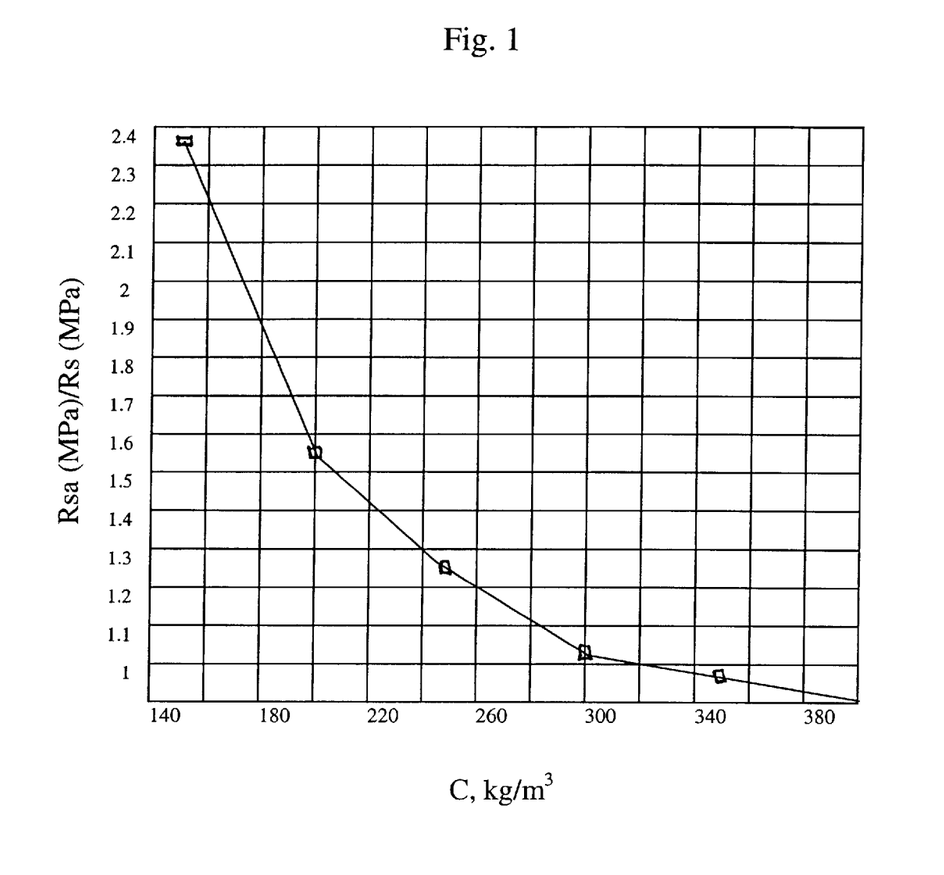
FIG. 1 is a graphic presentation depicting the dependence of the ratio Rsa(MPa)/Rs(MPa) of concretes upon their cement content (C, kg/m$^3$), wherein Rsa(MPa) is the strength of light-weight concrete using furnace bottom-ash from a thermal power station (density 1.0–1.2 g/cm$^3$ achieved with fly-ash additive; and Rs(MPa) is the strength of light-weight concrete using furnace bottom-ash from a thermal power station (density 1.0–1.2 g/cm$^3$) achieved without fly-ash additive.

(d) Essentially increasing the strength of light-weight concrete by the use of light-weight (porous) aggregates in a quantity which depends upon the increase in the density of the hardened cement paste, due to reduces porosity, in the concrete structure. The dependence of the ratio between the concrete strength (aged 28 days) using porous furnace bottom-ash (density 1.0–1.2 g/cm³) with fly-ash additive, Rsa(MPa), and concrete strength without fly-ash additive, Rs(MPa), is represented in FIG. 1. As shown in FIG. 1, the ratio Rsa(MPa)/Rs(MPa) changes from 1.0 to 2.5 and more, and increases as the cement content is reduced from 400 kg/m³ to 150 kg/m³.

Furthermore, the light-weight concretes of the present invention provide means to obtain light-weight concretes with a density of 1,000 to 1,800 kg/m³ for masonry units, walls and ceiling panels, insulating elements for ceilings and other purposes, as well as for structural concretes.

The light-weight concretes produced according to the present invention differ from existing products by increased density of the hardened cement mortar and imperviousness to water and undesired solutions, as well as by improved workability of the concrete.

The light-weight concretes of the present invention permit reduction of the cement content in light-weight concretes of at least 25–45% (not considering further reduction attributed to the increase in concrete strength), along with improving the building properties of the resulting concrete.

The light-weight concretes of the present invention are also characterized by reduced segregation of concrete mix constituents, the composition of which includes fly-ash particles with an intermediate density (e.g., 2.0–2.2 g/cm³) between the densities characterizing furnace bottom-ash (e.g., 1.0–1.8 g/cm³) and cement (e.g., 2.9–3.2 g/cm³).

In effect, the concrete mix according to the present invention includes a cement-additive paste and highly porous aggregates. The cement-additive paste includes less air-voids regularly characterizing pastes of similar cement content devoid of additive. Furthermore, the cement-additive paste at least partially fills-in the open pores in the porous aggregates, thereby increasing the density, strength and durability of the concrete while, at the same time, employing low cement content.

Introducing the light-weight concretes of the present invention into vast practice, will provide a comprehensive utilization of waste materials from thermal power stations (furnace bottom-ash and fly-ash) for light-weight concrete production, and will promote the improvement of the environment, as well as, it will lower the cost of concrete production.

The light-weight concretes of the present invention differ from known products by the efficient correlation of insulating and structural properties:

(a) The density of the light-weight concretes of the present invention with low cement content approximately equals half of a normal-weight concrete with normal-weight aggregates. For example, the mass of a conventional hollowed masonry unit with the dimensions of 200×200×400 mm$^3$, manufactured from the light-weight concrete of the present invention is approximately 10 kg, whereas the mass of a similar unit manufactured from normal-weight concrete is approximately 20 kg.

(b) The compression strength of the light-weight concrete of the present invention approximately equals that of normal-weight concrete with normal-weight aggregates with low cement content, typically used for the production of concrete masonry units.

(c) The thermal conductivity of the light-weight concrete of the present invention with a density of 1,000–1,200 kg/m$^3$, using furnace bottom-ash from thermal power stations and fly-ash, is not more than 0.35–0.4 W/m.° C. For comparison, the thermal conductivity of light-weight concrete using other light-weight aggregates such as tuff, pumice and volcanic slag is 0.44, 0.41 and 0.44, W/m.° C., respectively.

The following examples are of light-weight concretes manufactured according with the present invention. Materials used in these examples of concrete production are porous furnace bottom-ash with a density of 1.165 g/cm$^3$ and water absorption of 37%, fly-ash with a density of 2.05 g/cm$^3$, and Portland cement with activity of 25 MPa.

EXAMPLE 1

| Material | Material mass (kg/m$^3$) |
| --- | --- |
| Cement | 125 |
| Furnace bottom-ash* | 858 |
| Fly-ash | 185 |
| Water** | 382 |

* Coarse and fine aggregates.
** The volume of water includes, except for the portion of water used for cement hydration, the water need for furnace bottom-ash absorption and fly-ash moistening (when included).

Density of the resultant concrete after 28 days: 1,318 kg/m$^3$
Strength of the resultant concrete after 28 days: 6.8 MPa

EXAMPLE 2

| Material | Material mass (kg/m$^3$) |
| --- | --- |
| Cement | 150 |
| Furnace bottom-ash* | 790 |
| Fly-ash | 250 |
| Water** | 330 |

* Coarse and fine aggregates.
** The volume of water includes, except for the portion of water used for cement hydration, the water need for furnace bottom-ash absorption and fly-ash moistening (when included).

Density of the resultant concrete after 28 days: 1,359 kg/m$^3$
Strength of the resultant concrete after 28 days: 7.3 MPa

EXAMPLE 3

| Material | Material mass (kg/m$^3$) |
| --- | --- |
| Cement | 210 |
| Furnace bottom-ash* | 682 |
| Fly-ash | 322 |
| Water** | 390 |

* Coarse and fine aggregates.
** The volume of water includes, except for the portion of water used for cement hydration, the water need for furnace bottom-ash absorption and fly-ash moistening (when included).

Density of the resultant concrete after 28 days: 1,421 kg/m$^3$
Strength of the resultant concrete after 28 days: 7.5 MPa

EXAMPLE 4

| Material | Material mass (kg/m$^3$) |
| --- | --- |
| Cement | 270 |
| Furnace bottom-ash* | 500 |
| Fly-ash | 473 |
| Water** | 408 |

* Coarse and fine aggregates.
** The volume of water includes, except for the portion of water used for cement hydration, the water need for furnace bottom-ash absorption and fly-ash moistening (when included).

Density of the resultant concrete after 28 days: 1,506 kg/m$^3$
Strength of the resultant concrete after 28 days: 9.9 MPa

EXAMPLE 5

| Material | Material mass (kg/m$^3$) |
| --- | --- |
| Cement | 300 |
| Furnace bottom-ash* | 450 |
| Fly-ash | 494 |
| Water** | 408 |

* Coarse and fine aggregates.
** The volume of water includes, except for the portion of water used for cement hydration, the water need for furnace bottom-ash absorption and fly-ash moistening (when included).

Density of the resultant concrete after 28 days: 1,535 kg/m$^3$
Strength of the resultant concrete after 28 days: 13.3 MPa

EXAMPLE 6

A method of determining the absolute component volumes for concrete mix proportion including cement, light-weight aggregates and water (without additive) is effected, for example, by employing Equation 1 below:

$$1,000 = \frac{C}{d_C} + \frac{C.Ag}{d_{CAg}} + \frac{F.Ag}{d_{FAg}} + \frac{W}{d_W} + V_{EA} \quad (1)$$

where C, C.Ag, F.Ag and W are the content (in kilograms per cubic meter of concrete) of cement, coarse aggregate, fine aggregate and water, respectively; $V_{EA}$ is the volume (in liters) of air; and $d_C$, $d_{CAg}$, $d_{FAg}$ and $d_W$ are the densities (in kilograms per liter) of cement, coarse aggregate, fine aggregate and water, respectively.

The following is an example of light-weight concrete following Example 3 above, yet not including the additive.

| Material | Material mass (kg/m³) |
| --- | --- |
| Cement | 350 |
| Furnace bottom-ash* | 808 |
| Water** | 428 |

Density of the resultant concrete after 28 days: 1,368 kg/m³.
Strength of the resultant concrete after 28 days: 4.9 MPa.
Notes for Examples 1–5:

* Coarse and fine aggregates.
** The volume of water includes, except for the portion of water used for cement hydration, the water need for furnace bottom-ash absorption and fly-ash moistening (when included).

EXAMPLE 7

Table VI summarizes data of composition and physical characteristics of some light-weight concretes according to the present invention.

TABLE VI

| Water*/ cement ratio (W/C) | Concrete density Kg/m³ | Cement content (C) Kg/m³ | Cement content (C) % | Fly-ash (f.a.) % | Bottom ash (b.a.) % | Water % | f.a. / (f.a. + C) |
| --- | --- | --- | --- | --- | --- | --- | --- |
| 0.4 | 1,535 | 300 | 19.5 | 32.2 | 29.3 | 19.0 | 0.62 |
| 0.5 | 1,506 | 270 | 17.9 | 30.8 | 33.2 | 18.1 | 0.63 |
| 0.6 | 1,421 | 210 | 14.8 | 22.7 | 48.0 | 14.5 | 0.61 |
| 0.7 | 1,392 | 175 | 12.5 | 21.6 | 51.7 | 14.2 | 0.63 |
| 0.8 | 1,359 | 150 | 11.0 | 18.4 | 58.1 | 12.5 | 0.63 |
| 0.9 | 1,318 | 125 | 9.5 | 14.0 | 65.1 | 11.4 | 0.60 |
| 1.0 | 1,307 | 115 | 8.8 | 13.0 | 67.0 | 11.2 | 0.60 |

*not including the amount of water required for moistening the aggregate.

The invention further includes a method for manufacturing the improved cement-bound light-weight insulating structural monolithic aggregate concrete.

(a) A concrete mix proportion including cement, light-weight aggregates and water (without additive) is calculated by using ordinary methods of designing light-weight concretes such as the method of absolute component volumes of Example 6 above.

(b) A part of the cement (25–45% by mass) is replaced by the additive, accordingly the cement content in the concrete structure is reduced by 25–45% in mass.

(c) The additive is, in effect, added to the concrete mix proportion also over and above this quantity, such that the ratio of the mass of the additive and the total mass of the cement and the additive is typically in the range of 0.6–0.65. In other words an exceedingly high amount of additive is used in the concrete mix according to the present invention. As further described hereinabove, the additive allows increased density of the hardened cement mortar, by replacing air-voids typically located within the hardened paste with a fine material which is close in grading to cement, which material is mixed with the cement and water to form a cement-additive paste. This paste further serves to, at least partially, fill-in open pores in the porous light-weight aggregate present in the hardened mortar. Such use of the additive strengthens light-weight concretes characterized by low and medium cement content, by a factor of 1.1 to 2.5, and more.

(e) The relation between the quantity of additive and the mass of aggregate is not regulated in particular. However, it is necessary to take into account the increase in volume of the cement-additive paste as compared with a prior art cement paste (i.e., without additive). The ratio of the additive and the additive-plus-aggregates is about 0.16–0.52, however this ratio is a formal value since the additive does not relate to the aggregate composition.

Thus according to the present invention provided is an improved cement-bound insulating structural monolithic aggregate light-weight concrete possessing optimal correlation of desirable building properties of a concrete structure. The light-weight concrete of the present invention includes a hardened paste, the hardened paste including a hardened mixture of cement having a high density, typically in the range of about 2.9–3.3 g/cm³ and an additive, the additive is selected close in grading (particle size) to the cement and has a medium density, in the range of about 1.5–2.5 g/cm³. The light-weight concrete of the present invention further includes light-weight porous aggregates having a low density, in the range of about 1.0–1.8 g/cm³. According to the present invention the additive is for replacing air-voids in the hardened paste and for, at least partially, filling-in open pores in the light-weight porous aggregates, such that the light-weight concrete becomes denser and therefore stronger and more durable. The additive further serves for reducing the segregation of the light-weight porous aggregates while forming the concrete, and, at the same time, for reducing the cement content in the light-weight concrete.

In a preferred embodiment of the invention the light-weight concrete is prepared by preparing a concrete mix including about 8–20% of cement by weight, about 13–33% of additive by weight, and about 29–67% of light-weight aggregates by weight, and water.

Further according to the invention provided is a light-weight concrete mix which includes about 8–20% cement by weight, the cement having a high density, in the range of about 2.9–3.3 g/cm³, about 13–33% of an additive, by weight, the additive having a medium density, in the range of about 1.5–2.5 g/cm³, about 29–67% of a light-weight porous aggregate by weight, the aggregate having a low density, in the range of about 1.0–1.8 g/cm³, and water. The additive is for reducing the segregation of the light-weight porous aggregates while forming the concrete mix, while at the same time for reducing the cement content in the light-weight concrete mix.

Yet, further according to the invention provided is a method of manufacturing an improved cement-bound insulating structural monolithic aggregate light-weight concrete possessing optimal correlation of desirable building properties of a concrete structure, the method includes the step of preparing a concrete mix including about 8–20% cement by weight, the cement having a high density in the range of about 2.9–3.3 g/cm$^3$, about 13–33% of an additive by weight, the additive having a medium density in the range of about 1.5–2.5 g/cm$^3$, and about 29–67% of a light-weight porous aggregate by weight, the aggregate having a low density in the range of about 1.0–1.8 g/cm$^3$ and water. The method further includes the steps of forming a light-weight concrete article by molding the concrete in a mold; and drying the concrete article.

In a preferred embodiment of the invention the additive is fly-ash and/or grounded limestone, dolomite, and/or sandstone having a grain size smaller than about 100 μm.

In another preferred embodiment of the invention the cement is selected from the group of cements consisting of Portland cement and Portland blast-furnace cement.

In yet another preferred embodiment of the invention the aggregate is a fine light-weight aggregate having a bulk density lower than 1,200 kg/m$^3$ and passing a sieve of 4.75 mm, a coarse light-weight aggregate having a bulk density smaller than 1,000 kg/m$^3$ and retained in a sieve of 4.75 mm and a compound light-weight aggregate having a bulk density lower than 1,040 kg/m$^3$.

Preferably the light-weight aggregate is a furnace bottom-ash from thermal power stations, a natural volcanic igneous rock containing air-voids and having an open texture, and an aggregate produced by pyroprocessing of a natural material, an industrial by-product or a waste material.

The natural material is preferably clay, shale, slate, perlite or vermiculite. The industrial by-product and waste material are preferably industrial by-products and waste materials such as pelletized and stabilized pulverized-fuel ash, foamed blast-furnace slag, pelletized expanded blast-furnace slag and/or a fused residue from furnaces fired with coal which has not been pulverized.

In a preferred embodiment of the invention the weight ratio of the additive and the combination of the additive and the cement is about 0.6–0.73, preferably about 0.6–0.65.

In summary, the present invention is of a light-weight concrete comprising cement, highly porous coarse and/or fine aggregates, such as furnace bottom-ash from thermal power stations or other porous natural or artificial materials, with a porosity of about 20–50% and an additive, preferably fly-ash from thermal power stations or other, natural or artificial, finely ground materials passing a screen of about 100 μm, and water. According to the invention the additive is used for (i) closing (bridging) air-voids in the hardened paste thus formed and for closing open pores in the light-weight aggregates, which increases the concrete density and strength, although using the highly porous aggregates and low to medium cement content; (ii) increasing the durability of the concrete by closing the air-voids and pores in the hardened cement mortar; (iii) reducing the segregation of concrete mix constituents arising through the difference in density of the porous aggregates and the surrounding cement paste and (iv) lowering the consumption of cement.

While the invention has been described with respect to a limited number of embodiments, it will be appreciated that many variations, modifications and other applications of the invention may be made.

What is claimed is:

1. An improved cement-bound insulating structural monolithic aggregate light-weight concrete possessing optimal correlation of desirable building properties of a concrete structure, the light-weight concrete comprising:

(a) a hardened paste, said hardened paste including a hardened mixture of cement having a high density and an additive, said additive being close in grading to cement, having a grain size smaller than about 100 micrometers, and having a medium density in the range of about 1.5–2.5 g/cm$^3$; and (b) a light-weight porous aggregate having a low density in the range of about 1.0–1.8 g/cm$^3$, such that the light-weight concrete has a density lower than 1,800 kg/m$^3$;

said additive being for replacing air-voids in said hardened paste and for, at least partially, filling-in open pores in said light-weight porous aggregate, such that the light-weight concrete becomes denser and therefore stronger and more durable, said additive being further for reducing segregation of said light-weight porous aggregate while forming the concrete, while at the same time for reducing said cement content in said light-weight concrete.

2. The light-weight concrete of claim 1, wherein said additive is selected from the group consisting of fly-ash, limestone, dolomite, and sandstone having a grain size smaller than about 100 micrometers.

3. The light-weight concrete of claim 1, wherein said cement is selected from the group of cements consisting of Portland cement and Portland blast-furnace cement.

4. The light-weight concrete of claim 1, wherein said aggregate is selected from the group consisting of a fine light-weight aggregate having a bulk density lower than 1,200 kg/m$^3$ and passing a sieve of 4.75 mm, a coarse light-weight aggregate having a bulk density lower than 1,000 kg/m$^3$ and retained in a sieve of 4.75 mm and compound light-weight aggregate having a bulk density lower than 1,040 kg/m$^3$.

5. The light-weight concrete of claim 1, wherein said light-weight aggregate is selected from the group consisting of furnace bottom-ash from a thermal power station, natural volcanic igneous rocks containing air-voids and having an open texture and an aggregate produced by pyroprocessing of a natural material, an industrial by-product or a waste material.

6. The light-weight concrete of claim 5, wherein said natural material is selected from the group consisting of clay, shale, slate, perlite and vermiculite.

7. The light-weight concrete of claim 5, wherein said industrial by-product and waste material are selected from the group consisting of a pelletized and stabilized pulverized-fuel ash, a foamed blast-furnace slag, a pelletized expanded blast-furnace slag and a fused residue from furnaces fired with coal which has not been pulverized.

8. The light-weight concrete of claim 1 prepared by forming a concrete mix including about 8–20 percent of said cement by weight, about 13–33 percent of said additive by weight, and about 29–67 percent of said light-weight aggregate by weight, and water.

9. The light-weight concrete of claim 1, wherein the weight ratio of said additive and the combination of said additive and said cement is about 0.6–0.73.

10. A light-weight concrete mix comprising about 8–20 percent cement by weight having a high density, about 13–33 percent of an additive by weight having a medium density in the range of about 1.5–2.5 g/cm$^3$, said additive being close in grading to said cement, having a grain size smaller than about 100 micrometers, and about 29–67 percent of a light-weight porous aggregate by weight having a low density in the range of about 1.0–1.8 g/cm$^3$ and water, such that, when hardened, the light-weight concrete mix forms concrete having a density lower than 1,800 kg/m$^3$, said additive being for reducing segregation of said light-weight porous aggregate while forming the concrete mix, while at the same time for reducing said cement content in the light-weight concrete mix.

11. The light-weight concrete mix of claim 10, wherein said additive is selected from the group consisting of fly-ash, limestone, dolomite and sandstone having a grain size smaller than about 100 micrometers.

12. The light-weight concrete mix of claim 10, wherein said cement is selected from the group consisting of Portland cement and Portland blast-furnace cement.

13. The light-weight concrete mix of claim 10, wherein said aggregate is selected from the group consisting of a fine light-weight aggregate having a bulk density lower than 1,200 kg/m$^3$ and passing a sieve of 4.75 mm, a coarse light-weight aggregate having a bulk density lower than 1,000 kg/m$^3$ and retained in a sieve of 4.75 mm and a compound light-weight aggregate having a bulk density lower than 1,040 kg/m$^3$.

14. The light-weight concrete mix of claim 10, wherein said light-weight aggregate is selected from the group consisting of a furnace bottom-ash from a thermal power station, a natural volcanic igneous rock containing air-voids and having an open texture, and an aggregate produced by pyroprocessing of a natural material, an industrial by-product or a waste material.

15. The light-weight concrete mix of claim 14, wherein said natural material is selected from the group consisting of clay, shale, slate, perlite and vermiculite.

16. The light-weight concrete mix of claim 14, wherein said industrial by-product and waste material are selected from the group consisting of a pelletized and stabilized pulverized-fuel ash, a foamed blast-furnace slag, a pelletized expanded blast-furnace slag and a fused residue from furnaces fired with coal which has not been pulverized.

17. The light-weight concrete mix of claim 10, wherein the weight ratio of said additive and the combination of said additive and said cement is about 0.6–0.73.

18. A method of manufacturing an improved cement-bound insulating structural monolithic aggregate light-weight concrete possessing optimal correlation of desirable building properties of a concrete structure, the method comprising the steps of:

(a) preparing a concrete mix including about 8–20 percent cement by weight having a high density, about 13–33 percent of an additive by weight having a medium density in the range of about 1.5–2.5 g/cm$^3$, said additive being close in grading to said cement, having a grain size smaller than about 100 micrometers, and about 29–67 percent of a light-weight porous aggregate by weight having a low density in the range of about 1.0–1.8 g/cm$^3$, and water;

(c) forming a light-weight concrete article by molding the concrete in a mold; and (e) drying said concrete article, so as to obtain articles having a density lower than 1,800 kg/m$^3$.

19. The method of claim 18, wherein said additive is selected from the group consisting of fly-ash, limestone, dolomite and sandstone having a grain size smaller than about 100 micrometers.

20. The method of claim 18, wherein said cement is selected from the group of cements consisting of Portland cement and Portland blast-furnace cement.

21. The method of claim 18, wherein said aggregate is selected from the group consisting of a fine light-weight aggregate having a bulk density lower than 1,200 kg/m$^3$ and passing a sieve of 4.75 mm, a coarse light-weight aggregate having a bulk density lower than 1,000 kg/m$^3$ and retained in a sieve of 4.75 mm and a compound light-weight aggregate having a bulk density lower than 1,040 kg/m$^3$.

22. The method of claim 18, wherein said light-weight aggregate is selected from the group consisting of a furnace bottom-ash from a thermal power station, a natural volcanic igneous rock containing air-voids and having an open texture, and an aggregate produced by pyroprocessing of a natural material, an industrial by-product or a waste material.

23. The method of claim 22, wherein said natural material is selected from the group consisting of clay, shale, slate, perlite and vermiculite.

24. The method of claim 22, wherein said industrial by-product and waste material are selected from the group consisting of a pelletized and stabilized pulverized-fuel ash, a foamed blast-furnace slag, a pelletized expanded blast-furnace slag and a fused residue from furnaces fired with coal which has not been pulverized.

25. The method of claim 18, wherein the weight ratio of said additive and the combination of said additive and said cement is about 0.6–0.73.

* * * * *